United States Patent
Homma et al.

(10) Patent No.: US 9,256,041 B2
(45) Date of Patent: Feb. 9, 2016

(54) OPTICAL FIBER CABLE

(71) Applicant: SUMITOMO ELECTRIC INDUSTRIES, LTD., Osaka-shi, Osaka (JP)

(72) Inventors: Yuya Homma, Yokohama (JP); Itaru Sakabe, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 14/592,263

(22) Filed: Jan. 8, 2015

(65) Prior Publication Data

US 2015/0192749 A1    Jul. 9, 2015

(30) Foreign Application Priority Data

Jan. 9, 2014   (JP) ................. 2014-002485

(51) Int. Cl.
*G02B 6/44*   (2006.01)
*G02B 6/028*  (2006.01)
*G02B 6/036*  (2006.01)

(52) U.S. Cl.
CPC ............ *G02B 6/4434* (2013.01); *G02B 6/4432* (2013.01); *G02B 6/0288* (2013.01); *G02B 6/03627* (2013.01)

(58) Field of Classification Search
CPC .................................... G02B 6/4432
See application file for complete search history.

(56) References Cited

U.S. PATENT DOCUMENTS

2013/0129288 A1* 5/2013 Homma ............... G02B 6/4401
385/101

FOREIGN PATENT DOCUMENTS

JP         3815123 B2    8/2006
JP       2013-109003 A    6/2013

* cited by examiner

*Primary Examiner* — Uyen Chau N Le
*Assistant Examiner* — Chad Smith
(74) *Attorney, Agent, or Firm* — Drinker Biddle & Reath LLP (57) ABSTRACT

An optical fiber cable comprises a plurality of optical fibers, tensile strength fibers that accommodate the plurality of optical fibers, and a sheath formed with a thermoplastic resin and covering the tensile strength resin. In this optical fiber cable, when a Young's modulus of the sheath at 0° C. is E [MPa], a cross-sectional area of the optical fiber cable is S [mm²] and an inner diameter of the sheath of the optical fiber cable is Di [mm], ES (0° C.) [N] which is the product of the Young's modulus E at 0° C. and the cross-sectional area S, and the inner diameter Di [mm] satisfy:

$$\frac{ES(0°\ C.)}{Di} \leq 600 \qquad (1)$$

6 Claims, 9 Drawing Sheets

| STRUCTURE OF OPTICAL FIBER | | B1 | B2 | B3 | B4 | B5 | B6 | B7 |
|---|---|---|---|---|---|---|---|---|
| TYPE OF OPTICAL FIBER | | HPCF | HPCF | HPCF | AGF | AGF | AGF | AGF |
| NA | | 0.29 | 0.29 | 0.29 | 0.29 | 0.22 | 0.22 | 0.20 |
| REFRACTIVE INDEX PROFILE | | C1 | C1 | C1 | C2 | C2 | C2 | C3 |
| | Δcore | 1.1% | 1.1% | 1.1% | 1.9% | 1.1% | 1.1% | 1.1% |
| | Δtrench | — | — | — | −0.45% | −0.56% | −0.56% | — |
| | Δclad | −1.0% | −1.0% | −1.0% | 0.0% | 0.0% | 0.0% | 0.0% |
| | Wtrench | — | — | — | 5μm | 3μm | 3μm | — |
| CORE DIAMETER | | 80μm | 80μm | 80μm | 80μm | 50μm | 50μm | 50μm |
| CLADDING DIAMETER | | 125μm | 125μm | 125μm | 100μm | 80μm | 100μm | 125μm |
| DIAMETER OF NON-REMOVABLE RESIN | | | 135μm | 125μm | 125μm | 125μm | 125μm | — |
| DIAMETER OF PRIMARY RESIN LAYER | | — | — | 200μm | 200μm | 200μm | 200μm | 200μm |
| DIAMETER OF SECONDARY RESIN LAYER | | — | — | 245μm | 245μm | 245μm | 245μm | 245μm |
| DIAMETER OF COLORED LAYER | | — | 135μm | 255μm | 255μm | 255μm | 255μm | 255μm |

Fig.6

|  | EXAMPLES | | | | |
|---|---|---|---|---|---|
|  | 1 | 2 | 3 | 4 | 5 |
| STRUCTURE OF OPTICAL FIBER CABLE | A1 | A2 | A2 | A2 | A2 |
| STRUCTURE OF OPTICAL FIBER | B1 | B2 | B3 | B4 | B5 |
| OUTER DIAMETER Do [mm] | 4.2 | 4.2 | 4.2 | 4.2 | 4.2 |
| INNER DIAMETER Di [mm] | 2.0 | 2.0 | 2.0 | 2.0 | 2.0 |
| Do/Di | 2.10 | 2.10 | 2.10 | 2.10 | 2.10 |
| CROSS-SECTIONAL AREA S [mm$^2$] | 10.7 | 10.7 | 10.7 | 10.7 | 10.7 |
| MOMENT OF INERTIA OF AREA I [mm$^2$] | 14.5 | 14.5 | 14.5 | 14.5 | 14.5 |
| MATERIAL OF SHEATH | PVC | PVC | PVC | PVC | PVC |
| E(0°C)[MPa] | 45.0 | 45.0 | 45.0 | 45.0 | 45.0 |
| ES(0°C)[N] | 482.1 | 482.1 | 482.1 | 482.1 | 482.1 |
| ES(0°C)/Di | 241.0 | 241.0 | 241.0 | 241.0 | 241.0 |
| EI(0°C)[N·mm$^2$] | 652.0 | 652.0 | 652.0 | 652.0 | 652.0 |
| AMOUNT OF KEVLAR (d) | 4560 | 4560 | 4560 | 4560 | 4560 |
| WIDTH W OF RIBBON OPTICAL FIBER [mm] | — | 0.60 | 1.10 | 1.10 | 1.10 |
| THICKNESS T OF RIBBON OPTICAL FIBER [mm] | — | 0.20 | 0.30 | 0.30 | 0.30 |
| Rm | — | 0.85 | 0.69 | 0.69 | 0.69 |
| TEMPERATURE CHARACTERISTICS | A 0.08dB/100m | A 0.08dB/100m | A 0.11dB/100m | A 0.08dB/100m | A 0.07dB/100m |
| TENSION CHARACTERISTICS | A 0.05dB | A 0.05dB | A 0.05dB | A 0.05dB | A 0.05dB |
| LATERAL PRESSURE CHARACTERISTICS | B 1.4dB | A 0.03dB | A 0.02dB | A 0.03dB | A 0.03dB |
| BENDING CHARACTERISTICS | A 0.08dB | A 0.08dB | A 0.07dB | A 0.08dB | A 0.06dB |
| IMPACT CHARACTERISTICS | A 0.05dB | A 0.05dB | A 0.04dB | A 0.04dB | A 0.04dB |
| INITIAL OPTICAL CHARACTERISTICS | A 5.2dB/km | A 6.8dB/km | A 5.8dB/km | A 4.1dB/km | A 3.8dB/km |
| PINCH CHARACTERISTICS | A | A | A | A | A |
| EASINESS IN HANDLING | A | A | A | A | A |

Fig.7

| | EXAMPLES | | | | |
|---|---|---|---|---|---|
| | 6 | 7 | 8 | 9 | 10 |
| STRUCTURE OF OPTICAL FIBER CABLE | A2 | A2 | A2 | A2 | A2 |
| STRUCTURE OF OPTICAL FIBER | B6 | B7 | B2 | B2 | B2 |
| OUTER DIAMETER Do [mm] | 4.2 | 4.2 | 3.5 | 2.5 | 4.2 |
| INNER DIAMETER Di [mm] | 2.0 | 2.0 | 2.0 | 1.6 | 2.0 |
| Do/Di | 2.10 | 2.10 | 1.75 | 1.56 | 2.10 |
| CROSS-SECTIONAL AREA S [mm$^2$] | 10.7 | 10.7 | 6.5 | 2.9 | 10.7 |
| MOMENT OF INERTIA OF AREA I [mm$^2$] | 14.5 | 14.5 | 6.6 | 1.6 | 14.5 |
| MATERIAL OF SHEATH | PVC | PVC | PVC | PVC | PVC |
| E(0°C) [MPa] | 45.0 | 45.0 | 180 | 45.0 | 45.0 |
| ES(0°C) [N] | 482.1 | 482.1 | 1166.3 | 130.4 | 482.1 |
| ES(0°C)/Di | 241.0 | 241.0 | 583.2 | 81.5 | 241.0 |
| EI(0°C) [N·mm$^2$] | 652.0 | 652.0 | 1184.5 | 71.8 | 652.0 |
| AMOUNT OF KEVLAR (d) | 4560 | 4560 | 4560 | 1420 | 14000 |
| WIDTH W OF RIBBON OPTICAL FIBER [mm] | 1.10 | 1.10 | 0.60 | 0.60 | 0.60 |
| THICKNESS T OF RIBBON OPTICAL FIBER [mm] | 0.30 | 0.30 | 0.20 | 0.20 | 0.20 |
| Rm | 0.69 | 0.69 | 0.85 | 0.80 | 0.85 |
| TEMPERATURE CHARACTERISTICS | A 0.05dB/100m | A 0.14dB/100m | B 1.7dB/100m | A 0.07dB/100m | A 0.11dB/100m |
| TENSION CHARACTERISTICS | A 0.05dB | A 0.05dB | A 0.05dB | B 0.59dB | A 0.02dB |
| LATERAL PRESSURE CHARACTERISTICS | A 0.03dB | A 0.08dB | A 0.06dB | A 0.13dB | A 0.03dB |
| BENDING CHARACTERISTICS | A 0.06dB | B 0.57dB | A 0.11dB | A 0.14dB | A 0.08dB |
| IMPACT CHARACTERISTICS | A 0.04dB | A 0.07dB | A 0.07dB | A 0.09dB | A 0.05dB |
| INITIAL OPTICAL CHARACTERISTICS | A 3.5dB/km | A 3.7dB/km | A 6.22dB/km | A 6.6dB/km | B 14.1dB/km |
| PINCH CHARACTERISTICS | A | B | A | A | A |
| EASINESS IN HANDLING | A | A | B | A | A |

Fig.8

|  | EXAMPLES | | | | | |
| --- | --- | --- | --- | --- | --- | --- |
|  | 11 | 12 | 13 | 14 | 15 | 16 |
| STRUCTURE OF OPTICAL FIBER CABLE | A2 | A2 | A2 | A2 | A1 | A3 |
| STRUCTURE OF OPTICAL FIBER | B2 | B2 | B3 | B3 | B3 | B6 |
| OUTER DIAMETER Do [mm] | 4.2 | 3.0 | 2.0 | 4.2 | 4.5 | 3.5 |
| INNER DIAMETER Di [mm] | 1.5 | 2.1 | 1.4 | 1.6 | 1.4 | 2.0 |
| Do/Di | 2.80 | 1.43 | 1.43 | 2.63 | 3.21 | 1.75 |
| CROSS-SECTIONAL AREA S [mm$^2$] | 12.1 | 3.6 | 1.6 | 11.8 | 14.4 | 6.5 |
| MOMENT OF INERTIA OF AREA I [mm$^2$] | 15.0 | 3.0 | 0.6 | 15.0 | 19.9 | 6.6 |
| MATERIAL OF SHEATH | PVC | PVC | PVC | PVC | PVC | PE |
| E(0°C)[MPa] | 45.0 | 45.0 | 98.0 | 45.0 | 45.0 | 147.0 |
| ES(0°C)[N] | 543.9 | 162.2 | 157.0 | 533.0 | 646.4 | 952.5 |
| ES(0°C)/Di | 362.6 | 77.2 | 112.2 | 333.1 | 461.7 | 476.2 |
| EI(0°C)[N·mm$^2$] | 676.2 | 136.0 | 58.5 | 672.9 | 897.3 | 967.4 |
| AMOUNT OF KEVLAR (d) | 4560 | 4560 | 4560 | 4560 | 4560 | 4560 |
| WIDTH W OF RIBBON OPTICAL FIBER [mm] | 0.60 | 0.60 | 1.10 | 1.10 | — | 1.10 |
| THICKNESS T OF RIBBON OPTICAL FIBER [mm] | 0.20 | 0.20 | 0.30 | 0.30 | — | 0.60 |
| Rm | 0.78 | 0.86 | 0.40 | 0.54 | — | 0.54 |
| TEMPERATURE CHARACTERISTICS | A 0.17dB/100m | A 0.06dB/100m | B 0.68dB/100m | B 0.54dB/100m | B 0.61dB/100m | B 0.60dB/100m |
| TENSION CHARACTERISTICS | A 0.05dB | A 0.05dB | A 0.05dB | A 0.05dB | A 0.05dB | A 0.05dB |
| LATERAL PRESSURE CHARACTERISTICS | A 0.05dB | A 0.07dB | A 0.24dB | A 0.07dB | B 1.1dB | A 0.15dB |
| BENDING CHARACTERISTICS | A 0.11dB | B 0.52dB | B 0.61dB | A 0.11dB | A 0.11dB | A 0.08dB |
| IMPACT CHARACTERISTICS | A 0.05dB | A 0.05dB | B 0.89dB | A 0.05dB | A 0.05dB | A 0.08dB |
| INITIAL OPTICAL CHARACTERISTICS | A 7.8dB/km | A 6.0dB/km | A 6.1dB/km | A 5.2dB/km | A 7.0dB/km | A 4.4dB/km |
| PINCH CHARACTERISTICS | A | A | B | A | A | A |
| EASINESS IN HANDLING | A | A | A | A | A | B |

Fig.9

|  | COMPARATIVE EXAMPLES | | | | |
|---|---|---|---|---|---|
|  | 1 | 2 | 3 | 4 | 5 |
| STRUCTURE OF OPTICAL FIBER CABLE | A1 | A2 | A2 | A2 | A2 |
| STRUCTURE OF OPTICAL FIBER | B2 | B2 | B7 | B2 | B2 |
| OUTER DIAMETER Do [mm] | 4.2 | 3.5 | 4.2 | 3.0 | 2.0 |
| INNER DIAMETER Di [mm] | 2.0 | 2.0 | 2.0 | 1.0 | 1.4 |
| Do/Di | 2.1 | 1.8 | 2.1 | 3.0 | 1.4 |
| CROSS-SECTIONAL AREA S [mm$^2$] | 10.7 | 6.5 | 10.7 | 6.3 | 1.6 |
| MOMENT OF INERTIA OF AREA I [mm$^2$] | 14.5 | 6.6 | 14.5 | 3.9 | 0.6 |
| MATERIAL OF SHEATH | PVC | PE | PVC | PVC | PE |
| E(0°C)[MPa] | 115.0 | 190.0 | 150.0 | 98.0 | 581.0 |
| ES(0°C)[N] | 1232.0 | 1231.1 | 1606.9 | 615.8 | 930.9 |
| ES(0°C)/Di | 616.0 | 615.6 | 803.5 | 615.8 | 664.9 |
| EI(0°C)[N·mm$^2$] | 1666.2 | 1250.3 | 2173.4 | 384.8 | 346.8 |
| AMOUNT OF KEVLAR (d) | 4560 | 4560 | 4560 | 4560 | 4560 |
| WIDTH W OF RIBBON OPTICAL FIBER [mm] | — | 0.60 | 0.60 | 0.60 | 0.60 |
| THICKNESS T OF RIBBON OPTICAL FIBER [mm] | — | 0.20 | 0.20 | 0.20 | 0.20 |
| Rm | — | 0.85 | 0.85 | 0.60 | 0.76 |
| TEMPERATURE CHARACTERISTICS | C 2.4dB/100m | C 2.3dB/100m | C 2.8dB/100m | C 3.8dB/100m | C 3.5dB/100m |
| TENSION CHARACTERISTICS | A 0.05dB | A 0.05dB | A 0.05dB | A 0.05dB | A 0.05dB |
| LATERAL PRESSURE CHARACTERISTICS | B 1.3dB | A 0.02dB | A 0.06dB | A 0.12dB | A 0.10dB |
| BENDING CHARACTERISTICS | A 0.08dB | A 0.08dB | B 0.58dB | A 0.08dB | B 0.60dB |
| IMPACT CHARACTERISTICS | A 0.03dB | A 0.03dB | A 0.03dB | A 0.14dB | B 0.80dB |
| INITIAL OPTICAL CHARACTERISTICS | A 5.4dB/km | A 5.8dB/km | A 3.9dB/km | A 8.2dB/km | A 6.9dB/km |
| PINCH CHARACTERISTICS | A | A | B | A | B |
| EASINESS IN HANDLING | C | C | C | A | A |

OPTICAL FIBER CABLE

TECHNICAL FIELD

The present invention relates to an optical fiber cable.

BACKGROUND

In the field of inter-connection in which equipments or components within equipment are connected via optical fibers, it is desired to use optical fiber cables in place of conventional metal cables. In this field of inter-connection, an optical fiber cable including optical fibers is required to be able to maintain on-line working even if the optical fiber cable including the optical fibers is treated roughly, and required to have characteristics different from those of an optical fiber cable used as a trunk cable. As such characteristics, the optical fiber cable used in the field of inter-connection is required to have, for example, pinch characteristics that even if the optical fiber cable is pinched by being folded in two, optical fibers within the optical fiber cable are less likely to rupture, and mechanical characteristics that even if heavy things fall on the optical fiber cable or the optical fiber cable is stamped by a chair or the like, transmission loss is less likely to increase, and communication is not interrupted (see, for example, Japanese Patent Application Laid-Open No. 2013-109003 and Japanese Patent No. 3815123).

SUMMARY

While, as described above, the optical fiber cable used in the field of inter-connection is required to excel in pinch characteristics and mechanical characteristics, the optical fiber cable is further required to excel in temperature characteristics such that the optical fiber cable can be properly used even under low temperature (for example, 0° C.). However, with the conventional optical fiber cable, there is a case where a sheath of the cable may shrink at low temperature, which may make optical fibers meander and increase transmission loss of signal light depending on the cable diameter.

As one aspect, the present invention relates to an optical fiber cable. This optical fiber cable comprises: a plurality of optical fibers; tensile strength fibers that accommodate the plurality of optical fibers; and a sheath formed with a thermoplastic resin and covering the tensile strength fibers. In this optical fiber cable, when a Young's modulus of the sheath at 0° C. is E [MPa], a cross-sectional area of the optical fiber cable is S [mm$^2$], and an inner diameter of the sheath of the optical fiber cable is Di [mm], ES (0° C.) [N] which is the product of the Young's modulus E at 0° C. and the cross-sectional area S, and the inner diameter Di [mm] satisfy:

$$\frac{ES(0° \text{ C.})}{Di} \leq 600 \tag{1}$$

DETAILED DESCRIPTION

Explanation of an Embodiment of the Present Invention

First, an embodiment of the present invention will be listed and described.

As one aspect, the present invention relates to an optical fiber cable. This optical fiber cable comprises a plurality of optical fibers, tensile strength fibers that accommodate the plurality of optical fibers, and a sheath formed with a thermoplastic resin and covering the tensile strength fibers. In this optical fiber cable, when a Young's modulus of the sheath at 0° C. is E [MPa], a cross-sectional area of the optical fiber cable is S [mm$^2$], and an inner diameter of the sheath of the optical fiber cable is Di [mm], ES (0° C.) [N] which is the product of the Young's modulus E at 0° C. and the cross-sectional area S, and the inner diameter Di [mm] satisfy:

$$\frac{ES(0° \text{ C.})}{Di} \leq 600 \tag{1}$$

In this optical fiber cable, the Young's modulus E of the sheath, the cross-sectional area S, and the inner diameter Di of the sheath of the optical fiber cable are defined so as to satisfy the above-described relational expression (1), and when ES (0° C.)/Di falls within the above-described range (600 or less), temperature characteristics of the optical fiber cable become favorable at temperature of 0° C. or higher. This expression (1) indicates that there are conditions that even if a material having a large Young's modulus is used as the sheath when the inner diameter is large, temperature characteristics become favorable, and that, conversely, even if a material has a small Young's modulus when the inner diameter is small, temperature characteristics may degrade. While the above-described optical fiber cable may be used at 0° C. or higher, when ES (0° C.)/Di falls within the range of the above-described expression (1), the temperature characteristic of the optical fiber cable become favorable even if the temperature becomes 0° C. or higher. That is, according to the optical fiber cable that satisfies the above-described expression (1), even if the sheath shrinks due to low temperature, stress applied to the optical fibers can be suppressed within a fixed range, so that it is possible to prevent the optical fibers from meandering and suppress transmission loss of the optical fibers, thereby providing favorable temperature characteristics.

Because the Young's modulus becomes smaller for higher temperature, if ES (0° C.)/Di at 0° C. is 600 or less, in an environment where temperature is higher than 0° C., a value of ES of this optical fiber cable becomes smaller, and temperature characteristics become more favorable. Further, while the value of ES (0° C.)/Di indicated in the expression (1) may be 600 or less as described above, to realize an optical fiber cable with lower transmission loss, that is, with more favorable temperature characteristics, the value of ES (0° C.)/Di may be 400 or less. In this case, an acceptable range even in a case where an optical axis is displaced becomes large. It should be noted that, if ES (0° C.)/Di exceeds 600, because stress applied to the optical fibers when the sheath shrinks increases, the optical fibers may meander, which may degrade temperature characteristics of the optical fiber cable.

In the above-described optical fiber cable, when an outer diameter of the optical fiber cable is Do [mm], the outer diameter Do and the inner diameter Di may satisfy:

$$1.5 \leq \frac{Do}{Di} \leq 3.0 \qquad (2)$$

In this way, when Do/Di is less than 1.5, the optical fiber cable is more likely to kink when the optical fiber cable is pinched or bent with a small bending radius, or a bending radius of the fibers becomes locally small at kinked portions, and transmission loss is more likely to increase. On the other hand, if Do/Di exceeds 3.0, there is a case where the inner diameter of the optical fiber cable may become small or the temperature characteristics may degrade.

In the above-described optical fiber cable, the outer diameter Do of the optical fiber cable may fall within a range from 2.5 mm or larger to 4.5 mm or smaller. If the outer diameter Do of the optical fiber cable falls below 2.5 mm, the optical fibers within the optical fiber cable are more likely to rupture when the optical fiber cable is pinched. On the other hand, if the outer diameter Do of the optical fiber cable exceeds 4.5 mm, the outer diameter of the cable becomes too thick, and therefore, the cable becomes unsuitable in the field of the inter-connection.

In the above-described optical fiber cable, when a moment of inertia of area of the optical fiber cable is I [mm$^4$], flexural rigidity EI (0° C.) [N·mm$^2$] which is the product of the Young's modulus at 0° C. and the moment of inertia of area I may satisfy:

$$EI(0° C.) \leq 1200 \qquad (3)$$

The flexural rigidity EI is a parameter for determining easiness in handling of the optical fiber cable, and, when a value of the flexural rigidity EI is smaller, the cable becomes more flexible, and easiness of handling of the cable becomes favorable. Particularly, when the flexural rigidity EI exceeds 1200 [N/mm$^2$], it becomes difficult to bend the cable, and the optical fiber cable is not favorable in terms of easiness in handling. When the flexural rigidity EI (0° C.) at the optical fiber cable is 900 [N/mm$^2$] or less, easiness in handling becomes more favorable. It should be noted that the moment of inertia of area I used here is expressed by I=π(Do$^4$−Di$^4$)/64, where Do is the outer diameter of the optical fiber cable, that is, the outer diameter of the sheath, and Di is the inner diameter of the sheath of the optical fiber cable.

In the above-described optical fiber cable, heat shrinkage ratio of the cable may be 2.5% or lower. If the heat shrinkage ratio of the optical fiber cable exceeds 2.5%, the optical fibers are more likely to meander due to stress applied by shrinkage of the sheath, which may degrade temperature characteristics. Therefore, by setting the heat shrinkage ratio at 2.5% or lower, it is possible to provide favorable temperature characteristics. It should be noted that "heat shrinkage ratio" described here means shrinkage ratio of the optical fiber cable after the optical fiber cable is cut into a 150 mm length and heated at 110° C. for two hours, as expressed in the following expression. The heat shrinkage ratio of the optical fiber cable is measured in a state where the optical fibers and the tensile strength fibers are disposed within the optical fiber cable.

Heat shrinkage ratio(%)={(150 mm-cable length after heating)/150 mm}×100

The above-described heat shrinkage ratio can be adjusted to realize required heat shrinkage ratio by adjusting temperature or a cooling rate when the sheath is subjected to extrusion coating. When the sheath is drawn down, if a draw down ratio is close to 1, the heat shrinkage ratio can be made small. It is also possible to make the heat shrinkage ratio smaller by slowing the cooling rate.

In the above-described optical fiber cable, the plurality of optical fibers may be disposed within the optical fiber cable in the form of a ribbon optical fiber. By disposing the optical fibers in the form of a ribbon optical fiber, when a lateral pressure is applied to the optical fiber cable, it is possible to prevent increase of transmission loss due to the optical fibers contacting or crossing with each other. Further, when a connector is connected at a terminal of the cable, because the optical fibers are collectively coated, workability upon processing at the terminal is improved. Further, in the above-described case, when a width of the ribbon optical fiber is W [mm], and a thickness of the ribbon optical fiber is T [mm], the width W and the thickness T of the ribbon optical fiber and the inner diameter Di of the optical fiber cable may satisfy:

$$0.60 \leq \frac{\sqrt{Di^2 - W^2} - T}{Di} \qquad (4)$$

Figure 2:
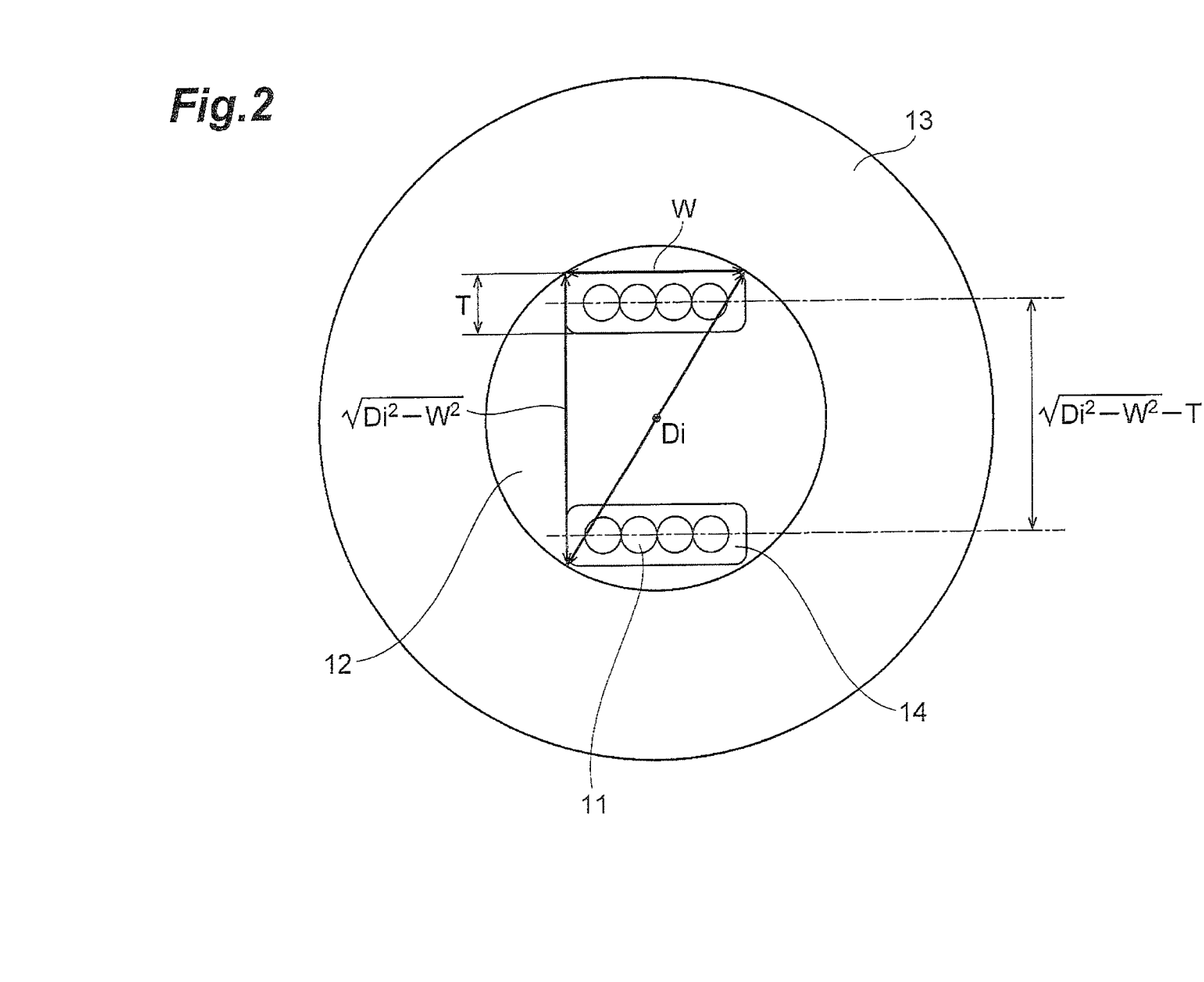
FIG. 2 is a diagram schematically illustrating a moving range of a ribbon optical fiber within tensile strength fibers of the present embodiment.

Here, (Di$^2$−W$^2$)$^{1/2}$−T indicates a moving range of the ribbon optical fiber. Further, as illustrated in FIG. 2, {(Di$^1$−W$^2$)$^{1/2}$−T}/Di indicates a ratio of a range where the ribbon optical fiber can move with respect to the inner diameter Di of the cable. If this ratio falls below 0.60, the moving range of the ribbon optical fiber becomes small, and the optical fibers are more likely to meander due to stress applied to the optical fibers by shrinkage of the sheath, and the temperature characteristics become degraded. It should be noted that if two or more ribbon optical fibers are included, while the width W of the ribbon optical fiber is the same regardless of the number of ribbon optical fibers, the thickness T of the ribbon optical fiber is calculated by a product of a thickness for each ribbon optical fiber and the number of ribbon optical fibers. For example, in the case of the optical fiber cable including two ribbon optical fibers each having a width of 1.1 [mm] and a thickness of 0.3 [mm], the width W described here is 1.1 [mm] and the thickness T is 0.6 [mm](=0.3 [mm]×2).

In the above-described optical fiber cable, at least one optical fiber among the plurality of optical fibers may have a portion including glass and a non-removable resin layer surrounding the portion including glass, and an outer diameter of the portion including glass may be 100 μm or less, and an outer diameter of the non-removable resin layer may be 140 μm or less. While a glass diameter of a general-purpose optical fiber is 125 μm, by setting the glass diameter at 100 μm or less, it is possible to reduce failure probability of the optical fiber even when the optical fiber is bent with a small bending radius, for example, when the optical fiber cable is pinched. Further, by coating an outer periphery of the glass having an outer diameter of 100 μm or less with a non-removable resin, it is possible to reduce rupture troubles of the optical fiber at a connector portion. Further, while, in a general-purpose optical fiber, it is often the case that the outer periphery of the glass having an outer diameter of 125 μm is coated with a primary resin layer having a low Young's modulus and a secondary resin layer having a high Young's modulus, when these two layers of coating are removed, there is a case where minute flaws may be generated on a surface of the glass, which may lead to fracture of the optical fiber at the connector portion. By attaching an optical fiber to which a non-removable resin layer adheres to the connector, it is possible to prevent rupture of the optical fiber. A diameter of the non-removable resin may be set 140 μm or less, or 125 μm or less so that a general-purpose ferrule can be used. Non-removable coating refers to a coated layer where, when a resin coated layer coating the non-removable coating is removed with a coating removal jig (such as a jacket remover JR-25 manufactured by Sumitomo Electric Industries, Ltd.) for optical fibers, the non-removable coating remains to tightly adhere to a layer under the resin coated layer, and the layer over the non-removable coating can be removed.

Details of the Embodiment of the Present Invention

Specific examples of the optical fiber cable according to the embodiment of the present invention will be described below with reference to the drawings. It should be noted that the present invention is not limited to these examples, and is intended to include all changes within the meaning recited in the claims and equivalent to the meaning of the claims and the scope of the claims. In the following description, the same reference numerals will be assigned to the same components, and overlapped explanation will be omitted.

Figure 1A:
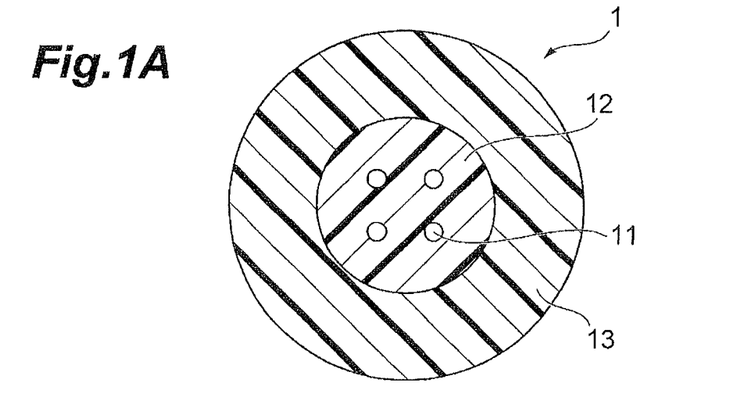
FIG. 1A, FIG. 1B and FIG. 1C are diagrams illustrating cross-sections of example structures of an optical fiber cable according to the present embodiment.

FIG. 1A, FIG. 1B and FIG. 1C are diagrams illustrating cross-sections of example structures of the optical fiber cable according to the present embodiment. An optical fiber cable 1 illustrated in FIG. 1A comprises a plurality of (in the present embodiment, for example, 4 cores) optical fibers 11, tensile strength fibers 12 that accommodates the plurality of optical fibers 11, and a thermoplastic resin sheath 13 that covers the tensile strength fibers 12. In this optical fiber cable 1, the tensile strength fibers 12 are disposed at an outer periphery of the discretely disposed four cores of the optical fibers 11, and the sheath formed with a thermoplastic resin is further disposed at an outer periphery of the tensile strength fibers 12.

Figure 1B:
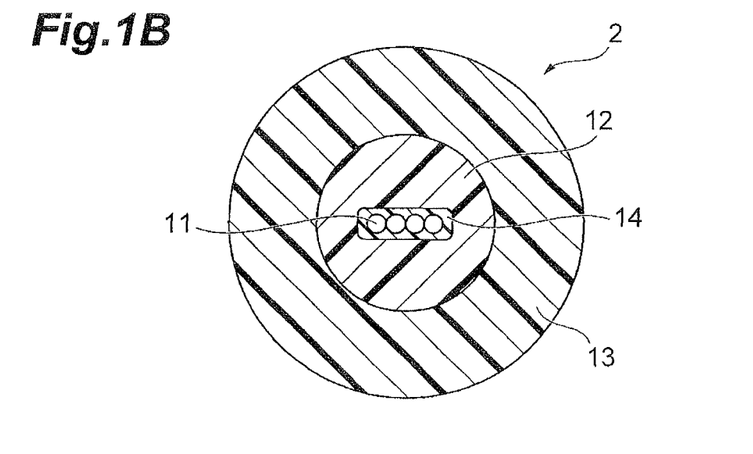
Figure 1C:
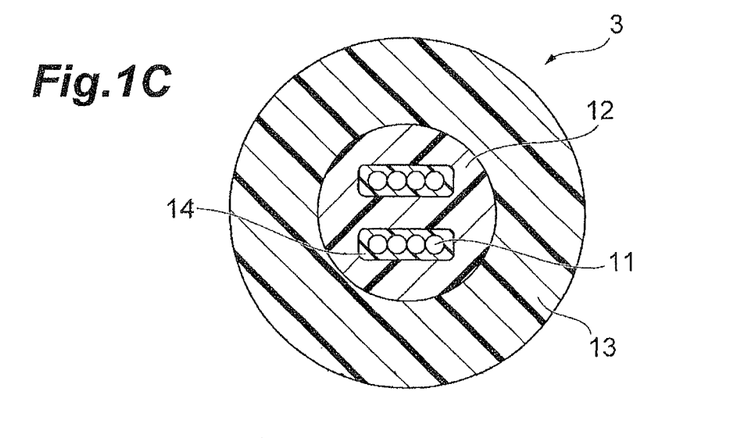

Further, in another optical fiber cables 2 and 3 illustrated in FIG. 1B and FIG. 1C, a plurality of (in the present embodiment, for example, four cores) optical fibers 11 which are integrally disposed in parallel, are respectively disposed within the optical fiber cables 2 and 3 in the form of a ribbon optical fiber 14. The optical fiber cable 2 comprises a ribbon optical fiber 14 including the plurality of optical fibers 11, tensile strength fibers 12 that accommodates the ribbon optical fiber 14, and a thermoplastic resin sheath 13 that covers the tensile strength fibers 12. Further, the optical fiber cable 3 comprises two ribbon optical fibers 14 disposed vertically in parallel, tensile strength fibers 12 that accommodates two ribbon optical fibers 14, and a thermoplastic resin sheath that covers the tensile strength fibers 12. The optical fiber cables 2 and 3 have the same configuration except the number of ribbon optical fibers 14 disposed.

While in FIG. 1A, FIG. 1B and FIG. 1C, four core optical fibers are illustrated as examples of the plurality of optical fibers 11 configuring the optical fiber cables 1 to 3, the number of cores of the optical fibers 11 is not limited to this and may be two cores, eight cores or 12 cores. A specific configuration of the optical fiber 11 will be described later.

Examples of favorable materials of the tensile strength fibers 12 disposed at the outer periphery of the optical fibers 11 include aramid fiber. Examples of products in the market of the above-described tensile strength fibers include "Kevlar (Trademark)" manufactured by Du Pont-Toray Co., Ltd. and "Technora (Trademark)" manufactured by Teijin Limited. The tensile strength fibers prevents distortion from being applied to the optical fibers when the optical fiber cable is pulled, and the amount used ranges preferably, for example, from 2000 deniers or larger to and 12000 deniers or smaller. If the amount used of the tensile strength fibers is less than 2000 deniers, tensile distortion is applied to the optical fibers when the optical fibers are pulled, which may increase transmission loss and may make the optical fiber cable unsuitable for use. On the other hand, if the amount used exceeds 12000 deniers, Kevlar may compress the optical fibers 11 and may deteriorate the initial optical characteristics of the optical fiber cable.

Examples of a material of the sheath 13 disposed at the outer periphery of the tensile strength fibers 12 include a polyvinyl chloride resin (PVC), polyethylene (PE) and polypropylene (PP). The thermoplastic resin configuring the sheath 13 preferably has tensile strength of 11 [MPa] or higher and rupture elongation of 180% or higher so as to be tough in terms of mechanical characteristics. These values are obtained through a tensile test at a tension rate of 100 mm/min using a dumbbell shaped test piece 2 at 23° C. based on JIS K7113. Further, in the thermoplastic resin configuring the sheath 13, a Young's modulus is calculated in a similar manner by implementing a tensile test at a tension rate of 1 mm/min using a dumbbell shaped test piece 2 at 0° C. and 23° C. based on JIS K7113 and by using a formula of a secant line at 2.5% strain. Further, the thickness of the sheath 13 is preferably 0.4 mm or greater. If the thickness of the sheath 13 falls below 0.4 mm, the sheath 13 may be damaged when heavy things fall thereon, which may cause increase of transmission loss or rupture at the optical fibers 11 in accordance with the damage of the sheath 13.

Figure 4A:
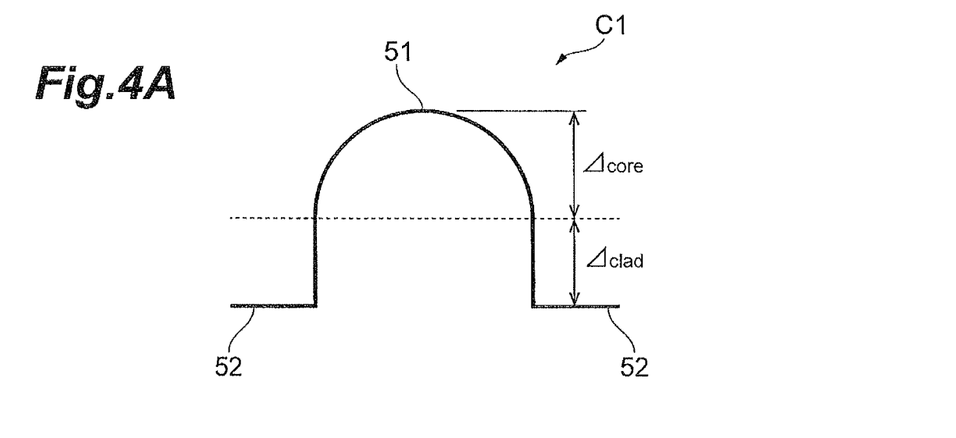
FIG. 4A, FIG. 4B and FIG. 4C are diagrams illustrating refractive index profiles of the optical fibers of the present embodiment.
Figure 4B:
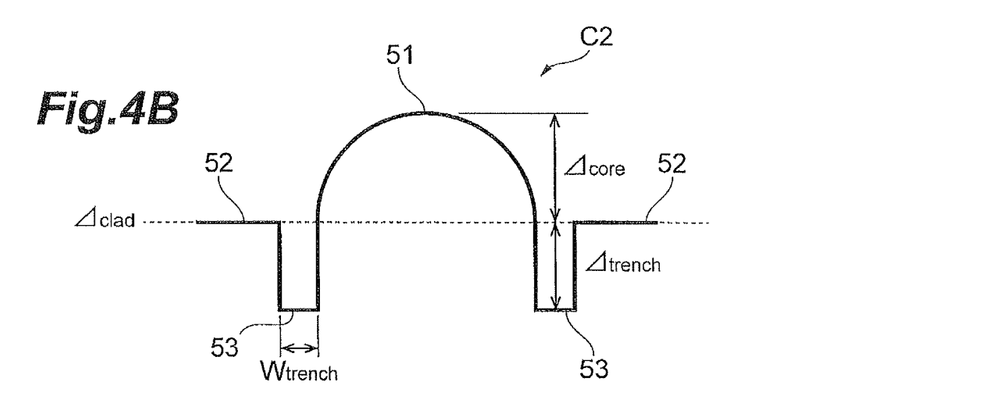
Figure 4C:
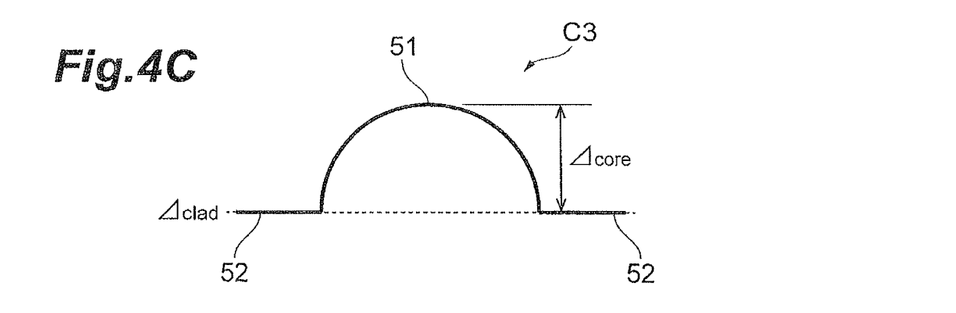
Figure 5:
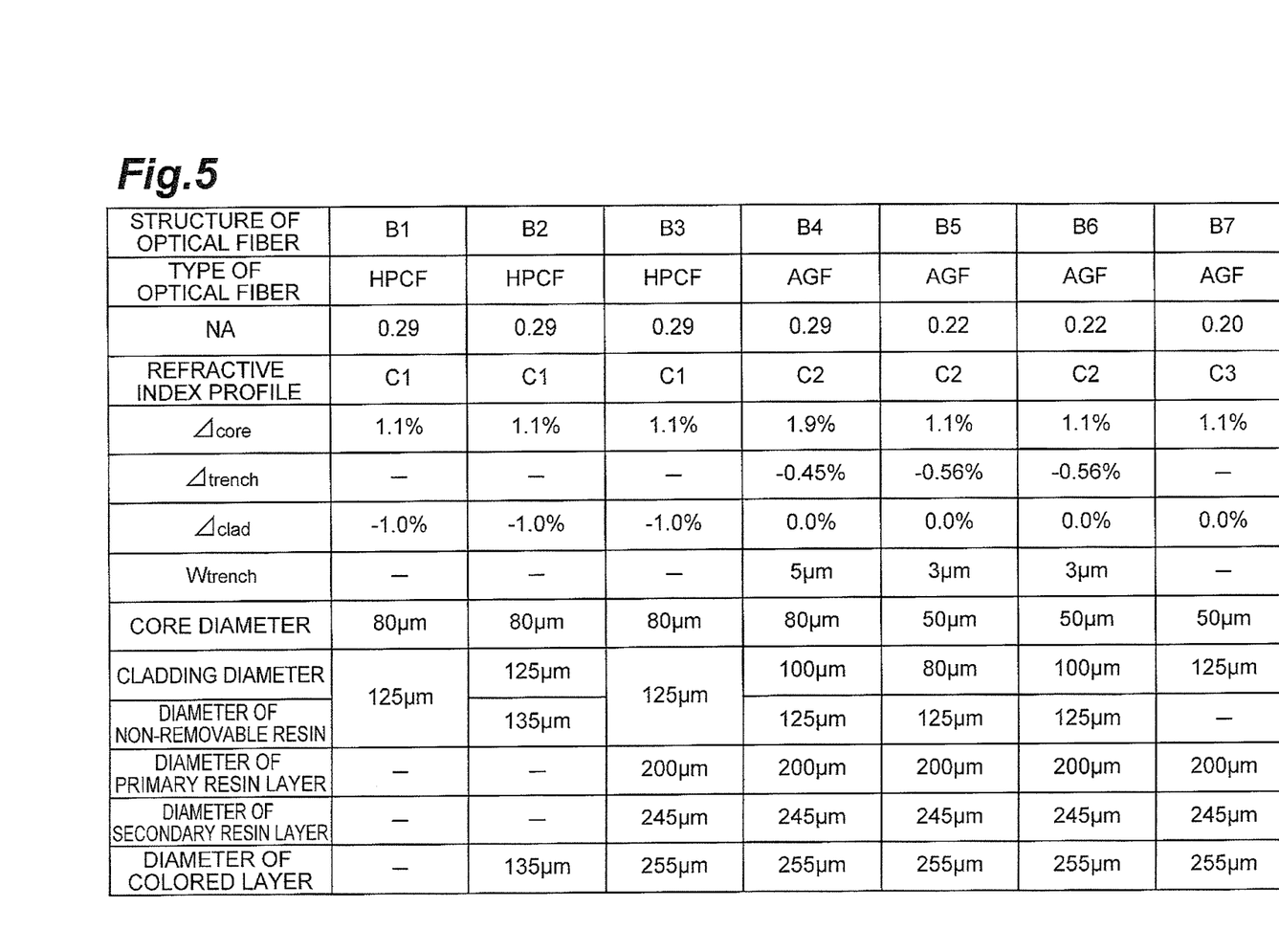
FIG. 5 is a table summarizing structures of the optical fiber according to the present embodiment.
Figure 6:
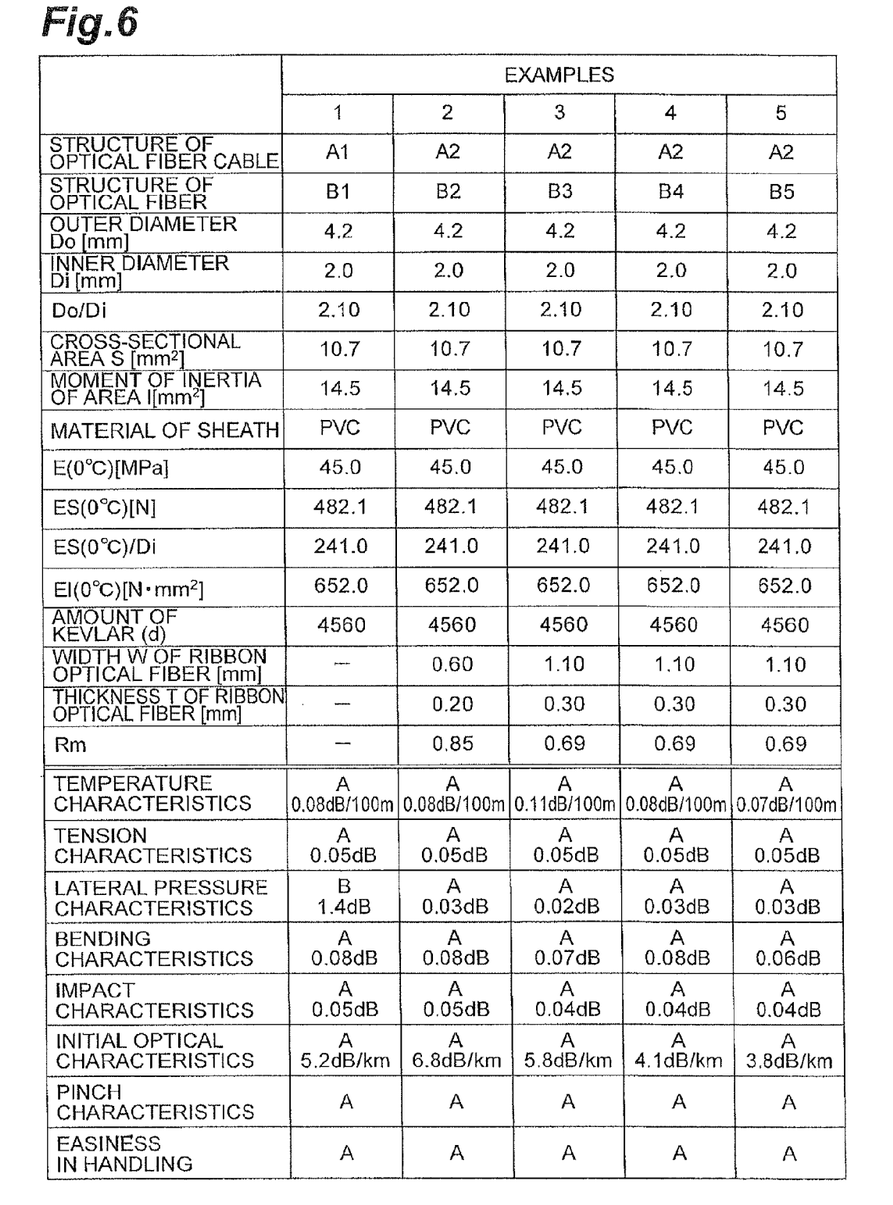
FIG. 6 is a table summarizing characteristics of optical fiber cables according to Examples 1 to 5.
Figure 7:
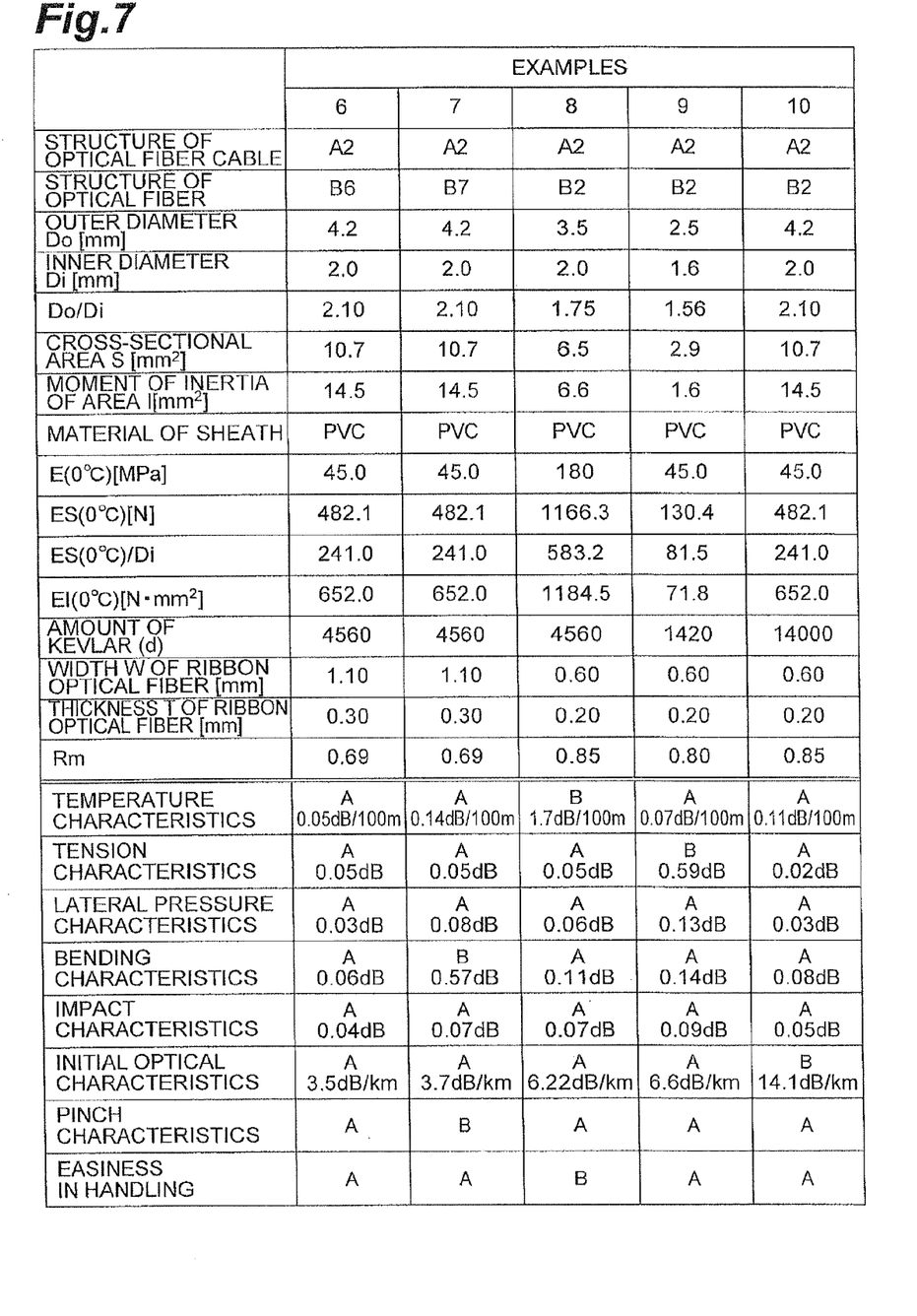
FIG. 7 is a table summarizing characteristics of optical fiber cables according to Examples 6 to 10.
Figure 8:
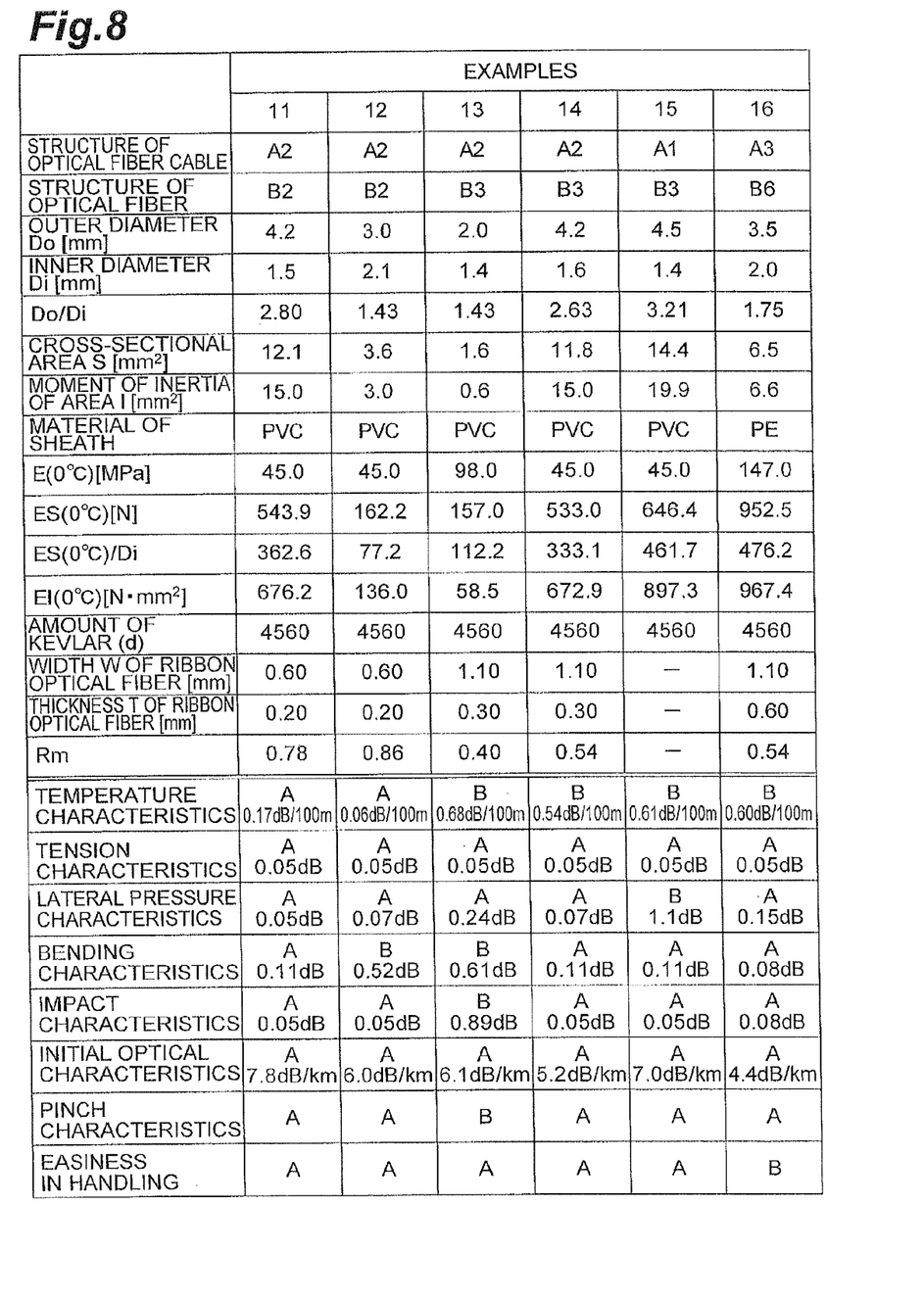
FIG. 8 is a table summarizing characteristics of optical fiber cables according to Examples 11 to 16.
Figure 9:
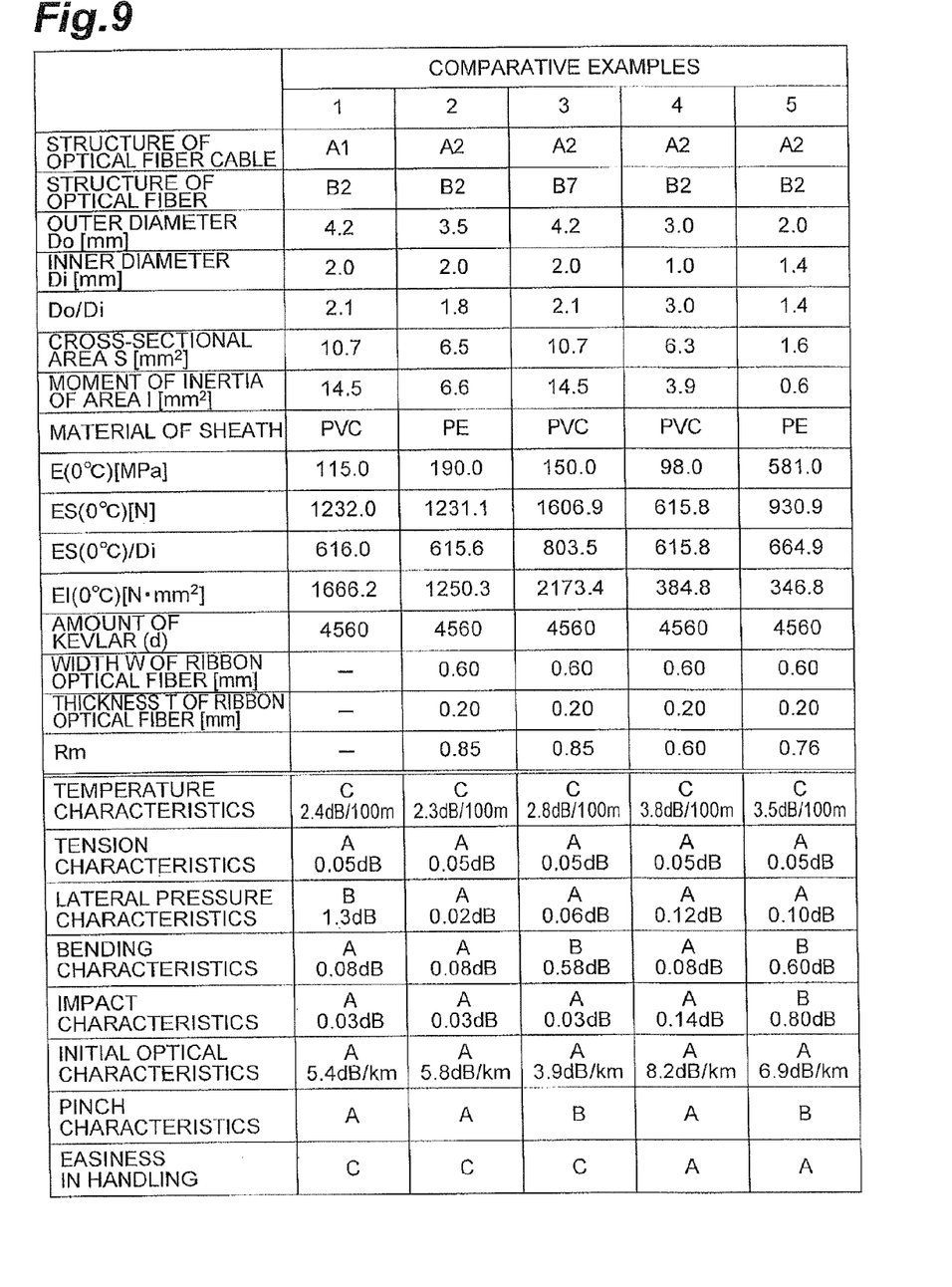
FIG. 9 is a table summarizing characteristics of optical fiber cables according to Comparative examples 1 to 5.

Subsequently, optical fibers used in the optical fiber cables 1 to 3 according to the present embodiment will be described with reference to FIG. 3A to FIG. 5. FIG. 3A to FIG. 3G are diagrams illustrating example structures of the optical fibers according to the present embodiment. FIG. 4A, FIG. 4B and FIG. 4C are diagrams illustrating refractive index profiles of the optical fibers of the present embodiment. FIG. 5 is a table summarizing types of the optical fibers for structures B1 to B7 of the optical fibers. In FIG. 5, $\Delta_{core}$, $\Delta_{trench}$ and $\Delta_{clad}$ are, respectively, refractive index difference of a core 51, a trench 53 and a cladding 52. Further, $W_{trench}$ is a width [μm] of the trench 53. The structures B1 to B7 of the optical fibers illustrated in FIG. 5 respectively correspond to the structures of the optical fibers 21 to 27 illustrated in FIG. 3.

Figure 3A:
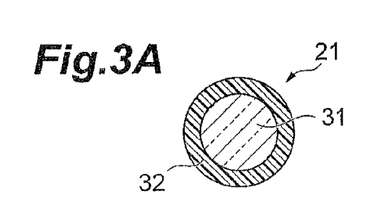
FIG. 3A to FIG. 3G are diagrams illustrating example structures of the optical fibers according to the present embodiment.
Figure 3B:
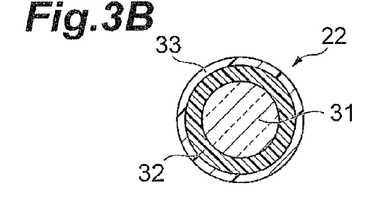
Figure 3C:
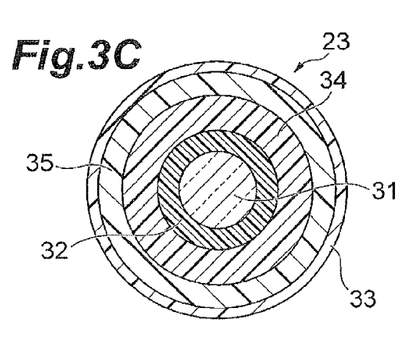

The optical fibers 21, 22 and 23 illustrated in FIG. 3A, FIG. 3B and FIG. 3C are optical fibers each comprising a core 31 formed with glass, and a cladding 32 formed with plastic (for example, a UV resin) and surrounding the core 31, and are HPCF (Hard Plastic Clad Fiber). The refractive index profile of the optical fibers 21, 22 and 23 are as indicated in the refractive index profile C1 illustrated in FIG. 4A. A GI (Graded Index) structure is employed in the core 31.

As illustrated in FIG. 3A, the optical fiber 21 (structure B1) comprises a core 31 and a cladding 32, and an outer diameter of the core 31 is, for example, 80 μm, and an outer diameter of the cladding 32 is, for example, 125 μm. When the optical fiber 21 is HPCF, and a portion formed with glass configures the core 31, a glass diameter of the optical fiber 21 is 80 μm. Further, in the optical fiber 21, a material forming the cladding 32 has a function of coating as a non-removable resin layer in addition to an optical function as a cladding, and an outer diameter of the non-removable resin layer of the optical fiber 21 is 125 μm.

As illustrated in FIG. 3B, the optical fiber 22 (structure B2) comprises a core 31 and a cladding 32 as with the optical fiber 21, and further comprises an ink coating layer 33 at an outer periphery of the cladding 32. The ink coating layer 33 is a layer provided to improve distinguishability of the optical fibers. In the optical fiber 22, as with the optical fiber 21, an outer diameter of the core 31 is, for example, 80 μm, and an outer diameter of the cladding 32 is, for example, 125 μm. Further, in the optical fiber 22, an outer diameter of the ink coating layer 33 is, for example 135 μm. Because a layer including the ink coating layer 33 functions as the non-removable resin by improving adhesion force between a resin of the cladding 32 and the ink coating layer 33, an outer diameter of the non-removable resin layer is 135 μm.

As illustrated in FIG. 3C, the optical fiber 23 (structure B3) comprises the core 31 and the cladding 32 as with the optical fiber 21, and, further, a primary resin layer 34 and a secondary resin layer 35 are sequentially coated on the outer periphery of the cladding 32. In the optical fiber 23, an ink layer is further coated on the outer periphery of the secondary resin layer 35 to form an ink coating layer 33. Because when this optical fiber 23 is used, layers of the primary resin layer 34 and above are removed, an outer diameter of the non-removable resin layer is 125 μm.

Further, the optical fibers 24, 25, 26 and 27 illustrated in FIG. 3D to FIG. 3G which are optical fibers each comprising a core 31 formed with glass, and a cladding 32 formed with glass and surrounding the core 31, are AGF (All Glass Fiber). Refractive index profile of the optical fibers 24, 25 and 26 is as indicated in the refractive index profile C2 illustrated in FIG. 4B, and has a trench 53 directly connecting to the core 51 and a cladding 52 outside the trench 53. As with the optical fiber 21, or the like, a GI (Graded Index) structure is employed in the core 31.

Figure 3D:
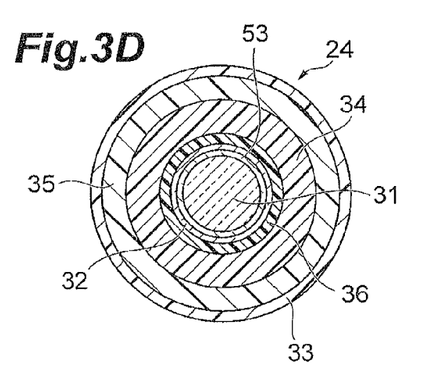

As illustrated in FIG. 3D, the optical fiber 24 (structure B4) comprises a core 31, a trench layer 53 surrounding the core 31, a cladding 32 surrounding the trench layer 53, a non-removable resin layer 36 surrounding the cladding 32, a primary resin layer 34 covering the non-removable resin layer 36, a secondary resin layer 35 covering the primary resin layer 34, and an ink coating layer 33 covering the secondary resin layer 35. In the optical fiber 24, an outer diameter of the core 31 is, for example, 80 μm, an outer diameter of the trench layer is, for example, 90 μm, an outer diameter of the cladding 32 is, for example, 100 μm, an outer diameter of the non-removable resin layer is, for example, 125 μm, an outer diameter of the primary resin layer 34 is 200 μm, an outer diameter of the secondary resin layer 35 is, for example, 245 μm, and an outer diameter of the ink coating layer 33 (colored layer) is 255 μm.

Figure 3E:
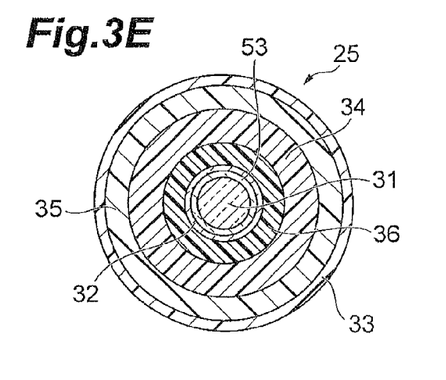
Figure 3F:
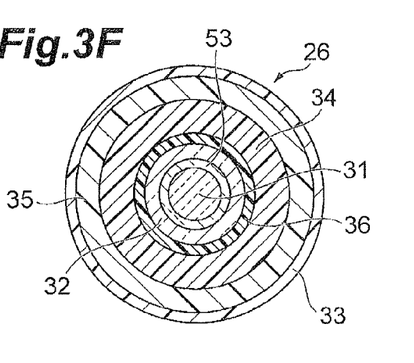

As with the optical fiber 24, the optical fiber 25 (structure B5) and the optical fiber 26 (structure B6) each comprise a core 31, a trench layer 53, a cladding 32, a non-removable resin layer 36, a primary resin layer 34, a secondary resin layer 35, and an ink coating layer 33. However, outer diameters of some layers of the optical fibers 25 and 26 are different from those of the optical fiber 24. In the optical fiber 25, an outer diameter of the core 31 is, for example, 50 μm, an outer diameter of the trench layer 53 is, for example, 56 μm, an outer diameter of the cladding 32 is, for example, 80 μm, an outer diameter of the non-removable resin layer 36 is, for example, 125 μm, an outer diameter of the primary resin layer 34 is, for example, 200 μm, an outer diameter of the secondary resin layer 35 is, for example, 245 μm, and an outer diameter of the ink coating layer 33 (colored layer) is, for example, 255 μm. Further, in the optical fiber 26, an outer diameter of the core 31 is, for example, 50 μm, an outer diameter of the trench layer 53 is 56 μm, an outer diameter of the cladding 32 is, for example, 100 μm, an outer diameter of the non-removable resin layer is, for example, 125 μm, an outer diameter of the primary resin layer 34 is 200 μm, an outer diameter of the secondary resin layer 35 is, for example, 245 μm, and an outer diameter of the ink coating layer 33 (colored layer) is 255 μm.

Figure 3G:
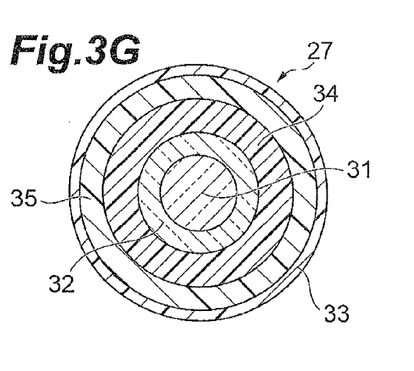

The refractive index profile of the optical fiber 27 (structure B7) is as indicated in the refractive index profile C3 illustrated in FIG. 4C. As with the optical fiber 21, or the like, a GI (Graded Index) structure is employed in the core 31 of the optical fiber 27. The optical fiber 27 comprises a core 31, a cladding 32 surrounding the core 31, a primary resin layer 34 surrounding the cladding 32, a secondary resin layer 35 covering the primary resin layer 34, and an ink coating layer 33 covering the secondary resin layer 35, and does not comprise a non-removable resin layer. In the optical fiber 27, an outer diameter of the core 31 is, for example, 50 μm, an outer diameter of the cladding 32 is, for example, 125 μm, an outer diameter of the primary resin layer 34 is 200 μm, an outer diameter of the secondary resin layer 35 is, for example, 245 μm, and an outer diameter of the ink coating layer 33 (colored layer) is 255 μm.

To reduce transmission loss during a mechanical test such as a bending test, the optical fiber 11 according to the present embodiment is preferably designed so that NA (numerical aperture) is 0.24 or higher, or designed so as to have a structure in which a trench is provided in the refractive index profile, or designed so as to realize both of the above. By designing the optical fiber as described above, it is possible to reduce transmission loss. Further, the non-removable resin layer 36, the primary resin layer 34, the secondary resin layer 35 and the ink coating layer 33 configuring the optical fiber 11 are preferably ultraviolet curing resins. As the ultraviolet curing resin, for example, an urethane acrylate resin, an epoxy acrylate resin, a cationically polymerizable resin, or the like are used. It should be noted that a silane coupling agent may be added to these resins. Further, it is preferable that a Young's modulus of the non-removable resin layer 36 is 600 [MPa] or higher, and adhesion force with glass is 5 [N/m] or higher. The primary resin layer 34 is a relatively soft resin layer whose Young's modulus is approximately 0.1 [MPa] or larger and 10 [MPa] or smaller, while the secondary resin layer 35 is a resin layer of a relatively hard material whose Young's modulus is approximately 200 [MPa] or larger and 1500 [MPa] or smaller. It should be noted that while the core of the optical fiber used in the present embodiment is a GI core, the core may be an SI (Step Index) core, and the outer diameter of the core, the outer diameter of the cladding, the outer diameter of the non-removable resin layer, the outer diameter of the primary resin layer (the primary diameter), the outer diameter of the secondary resin layer (the secondary diameter), the NA value, the refractive index difference Δ, the trench width, or the like, of the optical fiber are not limited to the above-described values.

Examples

While examples of the present invention will be described in detail below, the present invention is not limited to these examples, and may be modified in various ways.

First, as illustrated in FIG. 6 to FIG. 9, optical fiber cables according to Examples 1 to 16 and optical fiber cables according to Comparative examples 1 to 5 were respectively manufactured using PVC or PE which have different Young's moduli as materials of the sheaths. A structure A1 of the optical fiber cable according to Examples 1 to 16 and Comparative examples 1 to 5 correspond to the optical fiber cable 1 illustrated in FIG. 1A, and a structure A2 of the optical fiber cable corresponds to the optical fiber cable 2 illustrated in FIG. 1B. A structure A3 of the optical fiber cable corresponds to the optical fiber cable 3 illustrated in FIG. 1C. Further, structures B1 to B7 of the optical fibers included in the optical fiber cables according to Examples 1 to 16 and Comparative examples 1 to 5 respectively correspond to the optical fibers 21 to 27 illustrated in FIG. 3A to FIG. 3G and, specifically, the optical fiber structure B1 corresponds to the optical fiber 21, the optical fiber structure B2 corresponds to the optical fiber 22, the optical fiber structure B3 corresponds to the optical fiber 23, the optical fiber structure B4 corresponds to the optical fiber 24, the optical fiber structure B5 corresponds to the optical fiber 25, the optical fiber structure B6 corresponds to the optical fiber 26 and the optical fiber structure B7 corresponds to the optical fiber 27.

Next, the optical fiber cables manufactured according to the structures, materials and sizes illustrated in FIG. 6 to FIG. 9 were optically connected to have the following structure, and characteristics were measured. In the optical connection method used in these examples, at a light emitting portion, a VCSEL (Vertical Cavity Surface Emitting Laser) whose emission diameter is 10 μm was optically coupled with the end face of the optical fiber. Further, at a light outputting portion, a photo diode (PD) whose diameter of a light receiving element is 5 mm was optically coupled with the end face of the optical fiber. The output light from the VCSEL was made incident on the end face of the optical fiber to be evaluated, and the light output from the optical fiber was received at the photo diode (PD), and transmission loss, or the like, were measured.

It should be noted that a Young's modulus and heat shrinkage ratio of the sheath configuring the optical fiber cables according to Examples 1 to 16 and Comparative examples 1 to 5 were respectively measured using the following methods.

<Measurement of Young's Modulus of Sheath>

In measurement of the Young's modulus of the sheath configuring the optical fiber cable, a tensile test was implemented at a tension rate of 1 mm/min using a dumbbell shaped test piece 2 at 0° C. and 23° C. based on JIS K7113. The Young's modulus was calculated using a formula of a secant line at 2.5% strain.

In the present example, temperature characteristics, tension characteristics (tensile test), lateral pressure characteristics (lateral pressure test), bending characteristics (bending test), impact characteristics (impact test), initial optical characteristics, pinch characteristics (pinch test) and easiness in handling of the optical fiber cable were respectively measured or tested for the optical fiber cables according to Examples 1 to 16 and Comparative examples 1 to 5. Evaluation methods and test methods of each characteristics are as follows. It should be noted that results of measurement, or the like, are as indicated in FIG. 6 to FIG. 9.

<Temperature Characteristics>

An optical fiber cable of 100 m was wound to be a roll having a diameter of 400 mm and fixed by being tied with a string, and a heat cycle in which the optical fiber cable was cooled at 0° C. for four hours and then heated at 85° C. for four hours was repeated 10 times, and a maximum increment (difference before and after the heat cycle) [dB] of the transmission loss at 0° C. was obtained. Evaluation criteria are set as follows:

A . . . less than 0.5 [dB/100 m]
B . . . 0.5 [dB/100 m] or greater and less than 2.0 [dB/100 m]
C . . . 2.0 [dB/100 m] or greater <Tensile Test>

The optical fiber and the tensile strength fibers were drawn 1 m each from the both ends of the optical fiber cable of 5 m and integrated using an adhesive, and the tensile strength fibers at the both ends was made in a linear form, and an increment [dB] of the transmission loss when the optical fiber and the tensile strength fibers were pulled at force of 100 N was obtained. Evaluation criteria are set as follows:

A . . . less than 0.5 [dB]
B . . . 0.5 [dB] or greater and less than 2.0 [dB]

<Lateral Pressure Test>

A mandrel having a diameter of 60 mm was placed on an elongated optical fiber cable, and an increment [dB] of the transmission loss when load of 350 [N] was applied to the mandrel was obtained. Evaluation criteria are set as follows:

A . . . less than 0.5 [dB]
B . . . 0.5 [dB] or greater and less than 2.0 [dB]

<Bending Test>

An increment [dB] of the transmission loss when an optical fiber cable was wound one turn around a mandrel having a diameter of 3 mm was obtained. Evaluation criteria are set as follows:

A . . . less than 0.5 [dB]
B . . . 0.5 [dB] or greater and less than 2.0 [dB]

<Impact Test>

An increment [dB] of the transmission loss when a weight of 2 kg whose radius of a tip is 12.5 mm was dropped twice at the same portion of the elongated optical fiber cable from height of 15 cm was obtained. Evaluation criteria are set as follows:

A . . . less than 0.5 [dB]
B . . . 0.5 [dB] or greater and less than 2.0 [dB]

<Initial Optical Characteristics>

Initial transmission loss of the optical fibers within the optical fiber cable was measured using an optical pulse tester (OTDR, a wavelength of 850 nm). Further, a fiber of 1 km which is the same type of the fiber to be measured was used as a dummy fiber (optical fiber for transmitting light from a light source to an optical fiber which is a measurement sample). Evaluation criteria are set as follows:

A . . . less than 10 [dB/km]
B . . . 10 [dB/km] or greater and less than 20 [dB/km]

<Pinch Test>

An optical fiber cable was folded 180 degrees at one portion and maintained the folded state, and a rupture period of the optical fiber was obtained. Evaluation criteria are set as follows:

A . . . one month (30 days) or longer
B . . . one week or longer and shorter than one month <Easiness in Handling of Optical Fiber Cable>

A minimum bending radius at which an optical fiber cable does not change by springing back when the optical fiber cable was wound 20 turns was measured. The bending radius described herein means a minimum radius with which the optical fiber cable can be wound, and, if a radius is smaller than this minimum radius, the optical fiber cable cannot be wound due to rigidity of the optical fiber cable. Evaluation criteria are set as follows:

A . . . radius of less than 5 cm
B . . . radius of 5 cm or greater and less than 15 cm
C . . . radius of 15 cm or greater In the above-described evaluation criteria, while optical fiber cables having evaluation criteria of "A" are favorable in terms of reliability, because optical fiber cables of "B" can be practically used, optical fiber cables having "B" or higher were regarded as acceptable. It should be noted that optical fiber cables of "C" are not preferable in practical use, and therefore were regarded as unsuitable.

Results of the above-described tests are illustrated in FIG. 6 to FIG. 9.

In Example 1, the temperature characteristics, the tension characteristics, the bending characteristics, the impact characteristics, the initial optical characteristics, the pinch characteristics and the easiness in handling were "A" which is favorable in terms of reliability. In Example 1, because the optical fibers were formed with four single cores and the fibers were likely to contact with each other during the lateral pressure test, the lateral characteristics were "B". However, the optical fiber cable of Example 1 could be practically used.

In Examples 2 to 6, all of the temperature characteristics, the tension characteristics, the lateral pressure characteristics, the bending characteristics, the impact characteristics, the initial optical characteristics, the pinch characteristics and the easiness in handling were "A" which is favorable in terms of reliability.

In Example 7, the temperature characteristics, the tension characteristics, the lateral pressure characteristics, the impact characteristics, the initial optical characteristics and the easiness in handling were "A" which is favorable in terms of reliability. In Example 7, because NA of the fiber was 0.20 and there was no trench, the bending characteristics were "B". Further, because the glass diameter was 125 μm, the pinch characteristics were "B".

In Example 8, the tension characteristics, the lateral pressure characteristics, bending characteristics, the impact characteristics, the initial optical characteristics and the pinch characteristics were "A" which is favorable in terms of reliability. In Example 8, because values of ES (0° C.)/Di which are a value obtained by dividing the product of the Young's modulus E of the sheath and the cross-sectional area S of the optical fiber cable by the inner diameter Di of the sheath of the optical fiber cable, and EI (0° C.) which is the product of the Young's modulus E of the sheath and the moment of inertia of area I of the optical fiber cable, were large, the temperature characteristics and the easiness in handling were "B" while the temperature characteristics and the easiness in handling fell within an acceptable range.

In Example 9, the temperature characteristics, the lateral pressure characteristics, the bending characteristics, the impact characteristics, the initial optical characteristics, the pinch characteristics and the easiness in handling were "A" which is favorable in terms of reliability. In Example 9, because the amount of Kevlar was small, the tension characteristics were "B".

In Example 10, the temperature characteristics, the tension characteristics, the lateral pressure characteristics, the bending characteristics, the impact characteristics, the pinch characteristics and the easiness in handling were "A" which is favorable in terms of reliability. In Example 10, because the amount of Kevlar was large, the optical fiber was compressed by Kevlar, and, therefore, the initial optical characteristics were "B".

In Example 11, all of the temperature characteristics, the tension characteristics, the lateral pressure characteristics, the bending characteristics, the impact characteristics, the initial optical characteristics, the pinch characteristics and the easiness in handling were "A" which is favorable in terms of reliability.

In Example 12, the temperature characteristics, the tension characteristics, the lateral pressure characteristics, the impact characteristics, the initial optical characteristics, the pinch characteristics and the easiness in handling were "A" which is favorable in terms of reliability. In Example 12, because Do/Di which is a ratio between the outer diameter Do and the inner diameter Di of the optical fiber cable was 1.43, the optical fiber cable was slightly kinked when the optical fiber cable was bent with a small bending radius, and, therefore, the bending characteristics were "B".

In Example 13, the tension characteristics, the lateral pressure characteristics, the initial optical characteristics and the easiness in handling were "A" which is favorable in terms of reliability. In Example 13, $\{(Di^2-W^2)^{1/2}-T\}/Di$ which is a ratio Rm of a range where the ribbon optical fiber can move with respect to the inner diameter Di of the optical fiber cable was 0.40, and the motion of the ribbon optical fiber was restricted, and, therefore, the temperature characteristics were "B". Further, because Do/Di which is a ratio between the outer diameter Do and the inner diameter Di of the optical fiber cable was 1.43, the optical fiber cable was slightly kinked when the optical fiber cable was bent with a small bending radius, and, therefore, the bending characteristics were "B". Further, because the cable was thin and had a thickness of 0.3 mm, the impact characteristics were "B". Further, because the optical fiber cable was slightly kinked, and the outer diameter of the cable was small and 2.0 mm, and, therefore, the pinch characteristics were "B".

In Example 14, the tension characteristics, the lateral pressure characteristics, the bending characteristics, the impact characteristics, the initial optical characteristics, the pinch characteristics and the easiness in handling were "A" which is favorable in terms of reliability. In Example 14, because $\{(Di^2-W^2)^{1/2}-T\}/Di$ which is a ratio of a range where the ribbon optical fiber can move with respect to the inner diameter Di of the optical fiber cable was 0.40, and the motion of the ribbon optical fiber was restricted, the temperature characteristics were "B".

In Example 15, the tension characteristics, the bending characteristics, the impact characteristics, the initial optical characteristics, the pinch characteristics and the easiness in handling were "A" which is favorable in terms of reliability. In Example 15, because Do/Di which is a ratio between the outer diameter Do and the inner diameter Di of the optical fiber cable was 3.21, and a value of ES (0° C.)/Di was large, and, therefore, the temperature characteristics were "B" while the temperature characteristics fell within an acceptable range. Further, because the optical fibers included four single cores and the fibers were likely to contact with each other when a lateral pressure was applied, the lateral pressure characteristics were "B".

In Example 16, the tension characteristics, the lateral pressure characteristics, the bending characteristics, the impact characteristics, the initial optical characteristics, and the pinch characteristics were "A" which is favorable in terms of reliability. In Example 16, because $\{(Di^2|W^2)^{1/2}|T\}/Di$ which is a ratio Rm of a range where the ribbon optical fiber can move with respect to the inner diameter Di of the optical fiber cable was 0.54 and the motion of the ribbon optical fiber was restricted, the temperature characteristics were "B". Further, a value of EI (0° C.) which is the product of the Young's modulus E of the sheath and the moment of inertia of area I of the optical fiber cable was large, the easiness in handling was "B", while the easiness in handling fell within an acceptable range.

Meanwhile, in Comparative example 1, because ES (0° C.)/Di exceeded 600 which was a defined value, the temperature characteristics were "C" which is unfavorable for usage. Further, in Comparative example 1, because a value of EI (0° C.) which is the product of the Young's modulus E of the sheath and the moment of inertia of area I of the optical fiber cable exceeded 1200 which is a defined value, the easiness in handling was "C" which is unfavorable for usage. Because the optical fibers included four single cores and the fibers contacted with each other when a lateral pressure was applied, the lateral pressure characteristics were "B".

In Comparative examples 2 and 3, as with Comparative example 1, because values of ES (0° C.)/Di and EI (0° C.) respectively exceeded defined values (600 and 1200), the temperature characteristics and the easiness in handling were "C". In Comparative example 3, because the glass diameter was 125 µm, the pinch characteristics were "B". Further, because NA of the fiber was 0.20, and there was no trench, the bending characteristics were "B".

In Comparative examples 4 and 5, because a value of ES (0° C.)/Di exceeded the defined value (600), the temperature characteristics were "C". In Comparative example 5, Do/Di which is a ratio between the outer diameter Do and the inner diameter Di of the optical fiber cable was 1.4, the optical fiber cable was slightly kinked when the optical fiber cable was bent with a small bending radius, and, therefore, the bending characteristics were "B". Further, because the optical fiber cable was slightly kinked when the optical fiber cable was pinched and the outer diameter of the cable was small and 2.0 mm, the pinch characteristics were "B". Still further, because the cable was thin and had thickness of 0.3 mm, the impact characteristics were "B".

What is claimed is:

1. An optical fiber cable comprising:
   a plurality of optical fibers;
   tensile strength fibers that accommodate the plurality of optical fibers; and
   a sheath formed with a thermoplastic resin and covering the tensile strength fibers,
   wherein, when a Young's modulus of the sheath at 0° C. is E [MPa], a cross-sectional area of the optical fiber cable is S [mm$^2$], and an inner diameter of the sheath of the optical fiber cable is Di [mm], ES (0° C.) [N] which is a product of the Young's modulus E at 0° C. and the cross-sectional area S, and the inner diameter Di [mm] satisfy:

$$\frac{ES(0° \text{ C.})}{Di} \leq 600. \tag{1}$$

2. The optical fiber cable according to claim 1, wherein, when an outer diameter of the optical fiber cable is Do [mm], the outer diameter Do and the inner diameter Di satisfy:

$$1.5 \leq \frac{Do}{Di} \leq 3.0. \tag{2}$$

3. The optical fiber cable according to claim 1, wherein an outer diameter Do of the optical fiber cable is 2.5 mm or larger and 4.5 mm or smaller.

4. The optical fiber cable according to claim 1, wherein, when a moment of inertia of area of the optical fiber cable is I [mm$^4$], flexural rigidity EI (0° C.) [N·mm$^2$] which is a product of the Young's modulus E at 0° C. and the moment of inertia of area I satisfies:

$$EI(0° \text{ C.}) \leq 1200 \tag{3}.$$

5. The optical fiber cable according to claim 1, wherein the plurality of optical fibers are disposed within the optical fiber cable in a form of a ribbon optical fiber, and, when a width of the ribbon optical fiber is W [mm] and a thickness of the ribbon optical fiber is T [mm], the width W and the thickness T of the ribbon optical fiber and the inner diameter Di of the optical fiber cable satisfy:

$$0.60 \leq \frac{\sqrt{Di^2 - W^2} - T}{Di}. \tag{4}$$

6. The optical fiber cable according to claim 1, wherein at least one optical fiber among the plurality of optical fibers comprises:
   a portion including glass; and
   a non-removable resin layer surrounding the portion including glass, and
   a glass diameter which is an outer diameter of the portion including glass is 100 µm or less, and an outer diameter of the non-removable resin layer is 140 µm or less.

* * * * *